United States Patent [19]

Blau

[11] 3,744,524

[45] July 10, 1973

[54] FLEXIBLE PINCH VALVE FOR CONVEYING DRY MATERIALS AND SLURRIES

[76] Inventor: Robert E. Blau, 791 Rosewood Avenue, Winnetka, Ill.

[22] Filed: Sept. 8, 1970

[21] Appl. No.: 70,373

[52] U.S. Cl.......................... 137/636, 137/609, 251/6
[51] Int. Cl. ........................... F16k 7/06, F16k 11/14
[58] Field of Search ............................... 251/4, 6–9, 251/212; 137/609, 636, 601, 607; 222/529, 503

[56] References Cited
UNITED STATES PATENTS

| | | | |
|---|---|---|---|
| 2,721,052 | 10/1955 | Hull | 251/6 |
| 3,197,173 | 7/1965 | Taubenheim | 251/6 |
| 2,624,364 | 1/1953 | Detlefsen | 251/7 X |
| 2,841,357 | 7/1958 | Little | 251/6 |
| 3,054,425 | 9/1962 | Pribonic | 251/9 X |

FOREIGN PATENTS OR APPLICATIONS

| | | | |
|---|---|---|---|
| 973,168 | 9/1950 | France | 251/7 |

Primary Examiner—Henry T. Klinksiek
Assistant Examiner—Richard Gerard
Attorney—Parker, Carter & Markey

[57] ABSTRACT

A molded, one piece, generally Y-shaped, flexible, tubular valve body formed of a fabric reinforced elastomer. The valve body is mounted in a housing which also supports a roller type pinching mechanism to open and close the legs of the Y-shaped valve body. A nose portion is formed as part of the valve body at the juncture of the legs of the valve body and moves in the direction of the leg being pinched closed. The nose portion is reinforced by a stiff arcuate shaped insert. The configuration of the valve body and its mounting on the housing permits flexing of the portion of the valve body upstream of the nose portion during opening and closing of the leg portions of the valve body. This construction permits the pinching elements to be positioned close to the juncture of the legs of the Y-shaped valve body, thus reducing the volume of the plug of material that is trapped in the branch leg upon closing thereof.

4 Claims, 5 Drawing Figures

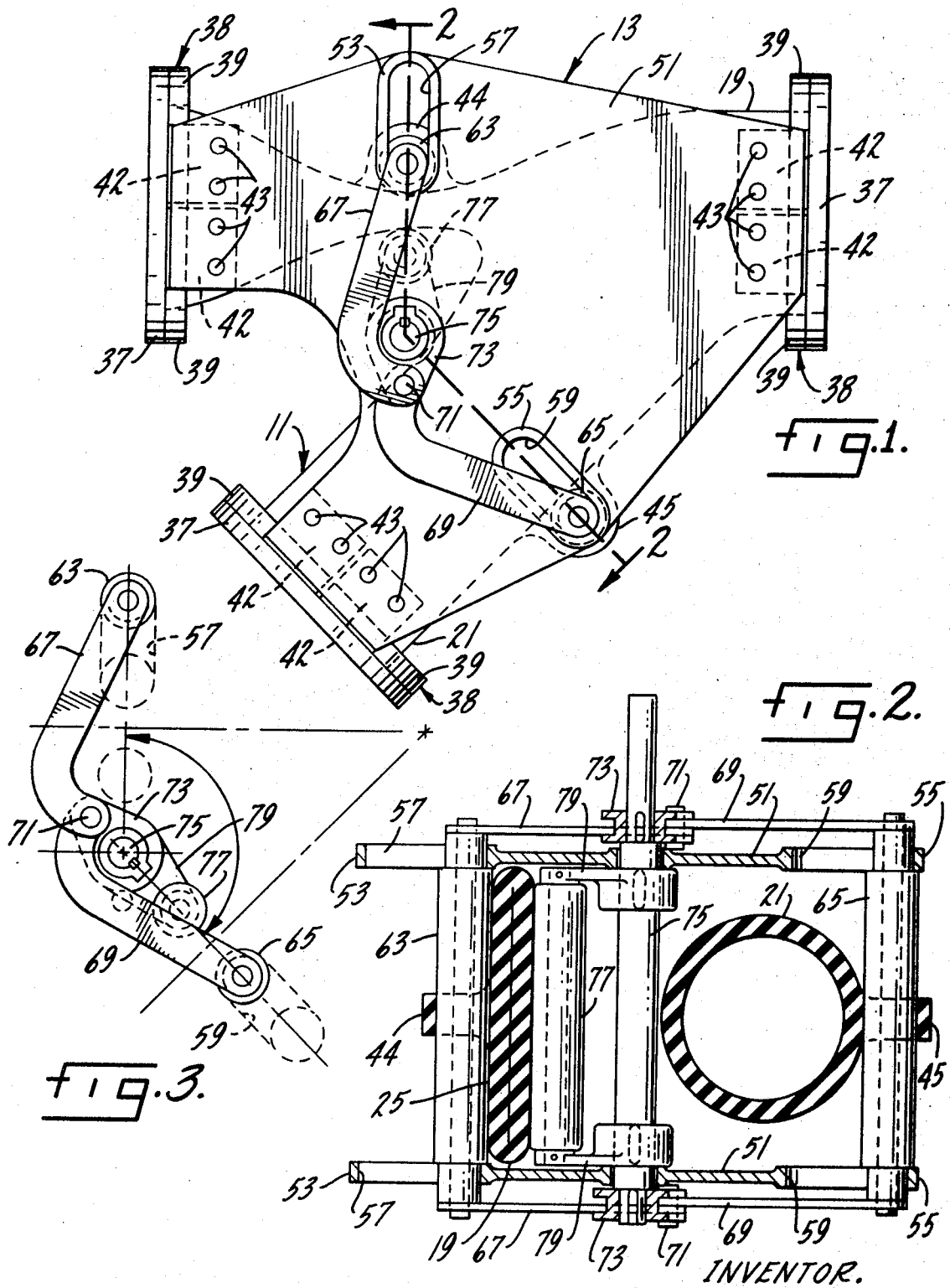

INVENTOR.
Robert E. Blau
BY Parker, Carter & Markey
Attorneys.

FLEXIBLE PINCH VALVE FOR CONVEYING DRY MATERIALS AND SLURRIES

SUMMARY OF THE INVENTION

This invention is concerned with a molded, one-piece generally Y-shaped, tubular, flexible valve body formed of a fabric reinforced elastomer. It is more particularly concerned with such a valve body that is closed by pinch means arranged so that a minimum sized slug of material is trapped in the branch leg upon closing.

An object of this invention is a one-piece generally Y-shaped tubular, flexible valve body having legs which may be pinched closed. nd closing outttt porto41

Another object is a one-piece generally Y-shaped tubular, flexible valve body having a nose portion formed as part of the valve body at the juncture of the branch leg and the outlet portion of the straight leg and which is adapted to move in the direction of the leg being pinched closed.

Another object is a one-piece generally Y-shaped tubular, flexible valve body in which the inlet portion of the straight leg is adapted to move and flex during opening and closing of the leg portions of the valve body.

Another object is a one-piece generally Y-shaped tubular, flexible valve body in which the pinching elements are positioned close to the juncture of the legs of the valve body to reduce the size of the plug of material trapped in the branch leg upon closing thereof.

Another object is a Y-shaped one-piece valve which will replace two valves and a Y-fitting previously used for switching or diverting purposes.

Another object is a three way, generally Y-shaped valve body and housing having a roller pinching mechanism for alternately closing either leg of the Y-shaped valve body and using only three rollers.

Another object is a pinch valve in which the flexible tubular valve body is provided with means to permit the pinch rollers to positively open the valve body.

Another object is a three way pinch valve having pinch rollers whose movement is controlled by rotation of a single shaft.

Another object is a one-piece generally Y-shaped flexible, tubular valve body having a nose portion at the juncture of the legs of the valve body, which nose portion is moved by one of the pinch rollers during opening and closing of the legs.

Other objects may be found in the following specification, claims and drawings.

BRIEF DESCRIPTION OF THE DRAWINGS

The invention is illustrated more or less diagrammatically in the following drawing wherein:

FIG. 1 is a side elevational view of the valve body and housing of this invention;

FIG. 2 is a top plan section view taken along line 2—2 of FIG. 1, with parts rotated;

FIG. 3 is a side elevational view of the linkage and roller mechanism with the links and rollers in the opposite extreme position from that shown in FIG. 1 and with parts of the housing and valve body omitted for clarity of illustration;

DESCRIPTION OF THE PREFERRED EMBODIMENT

Figure 4:
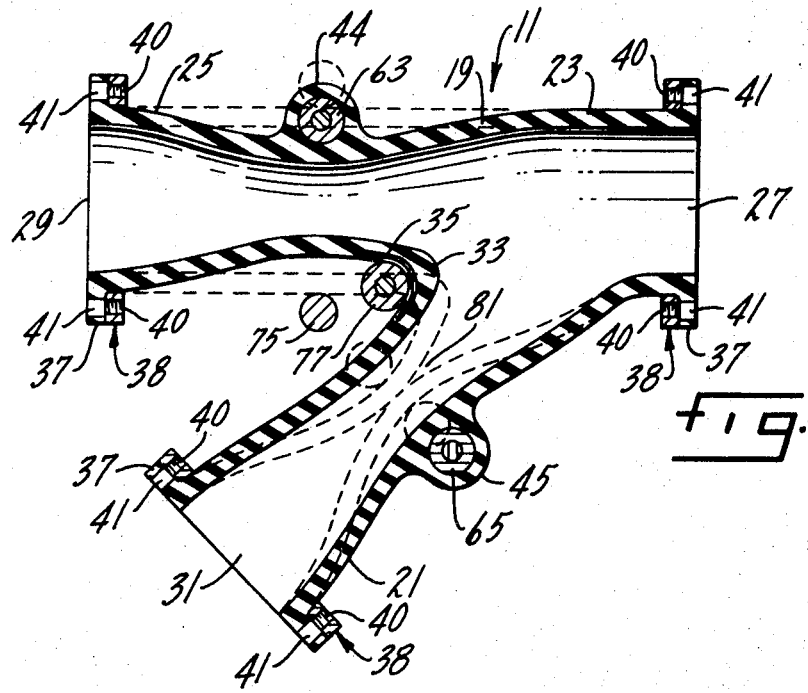
FIG. 4 is a longitudinal cross-sectional view of the valve body shown in an intermediate position of operation with the closed position of the branch leg and th open position of the main leg shown by dashed lines.

Referring to the drawings and especially FIGS. 1 and 4, a one-piece generally Y-shaped, flexible, tubular valve body 11 is shown mounted in a metal housing 13. The valve body is molded of a fabric reinforced elastomer and has a straight leg 19 and a branch leg 21. The branch leg extends from the straight leg from intermediate the ends thereof and the legs form an acute angle with each other. The branch leg divides the straight leg into inlet portion 23 and outlet portion 25. The straight leg has an opening 27 which functions as an inlet and an opening 29 which functions as an outlet. The branch leg 21 has an opening 31 which functions as an outlet.

The walls of the valve body at the juncture of the straight leg 19 and the branch leg 21 form a nose portion 33. The nose portion is reinforced by a stiff arcuate insert 35 which may be formed of metal. Flanges 37 are formed integral with the valve body at each opening therein. Split metal flanges 38, each formed of two annular sections 39, are positioned on the valve body against the inside of each flange 37. Threaded openings 40 are formed in each flange section to align with openings 41 in flanges 37. Integral flat projecting pieces 42 extend from the ends of the annular flange sections 39 and are fastened to the valve housing 13 by fasteners 43. Pinch roller retaining loops 44 and 45 are formed integrally with the tubular valve body 11. Loop 44 is located on the outlet portion 25 of the straight leg 19 and loop 45 is located on the branch leg 21.

The housing 13 includes a pair of Y-shaped plates 51 located on opposite sides of the valve body 11. Upstanding walls 53 and 55 are formed integrally with the plates 51 and are located at opposite legs thereof to define pinch roller slots 57 and 59. The slots of one plate 51 are aligned with the respective slots of the other plate 51 in the manner shown in FIG. 2.

A pinch roller 63 is mounted for movement in aligned slots 57 and a pinch roller 65 is mounted for movement in aligned slots 59. These rollers extend through the loops 44 and 45 of the tubular flexible valve body 11. L-shaped links 67 and 69 are located at each end of the rollers outwardly of the housing plates 51. The links at one of their ends are pivotally connected respectively to the pinch rollers 63 and 65 and are pivotally connected at their opposite ends by pins 71 to collars 73 keyed to an operating shaft 75. The operating shaft is positioned between the outlet portion 25 of leg 19 and branch leg 21 of the Y-shaped valve body. A third pinch roller 77 is connected by arms 79 to the control shaft 75.

In FIG. 4, the closed position of the branch leg 21 is shown by dashed lines. Upon closing, the wall of the branch leg 21 comes together at 81. Any material in the branch leg between the collapsed wall 81 and the straight leg 19 will be trapped, forming a slug of material which must be blown out when the branch leg is reopened.

Figure 5:
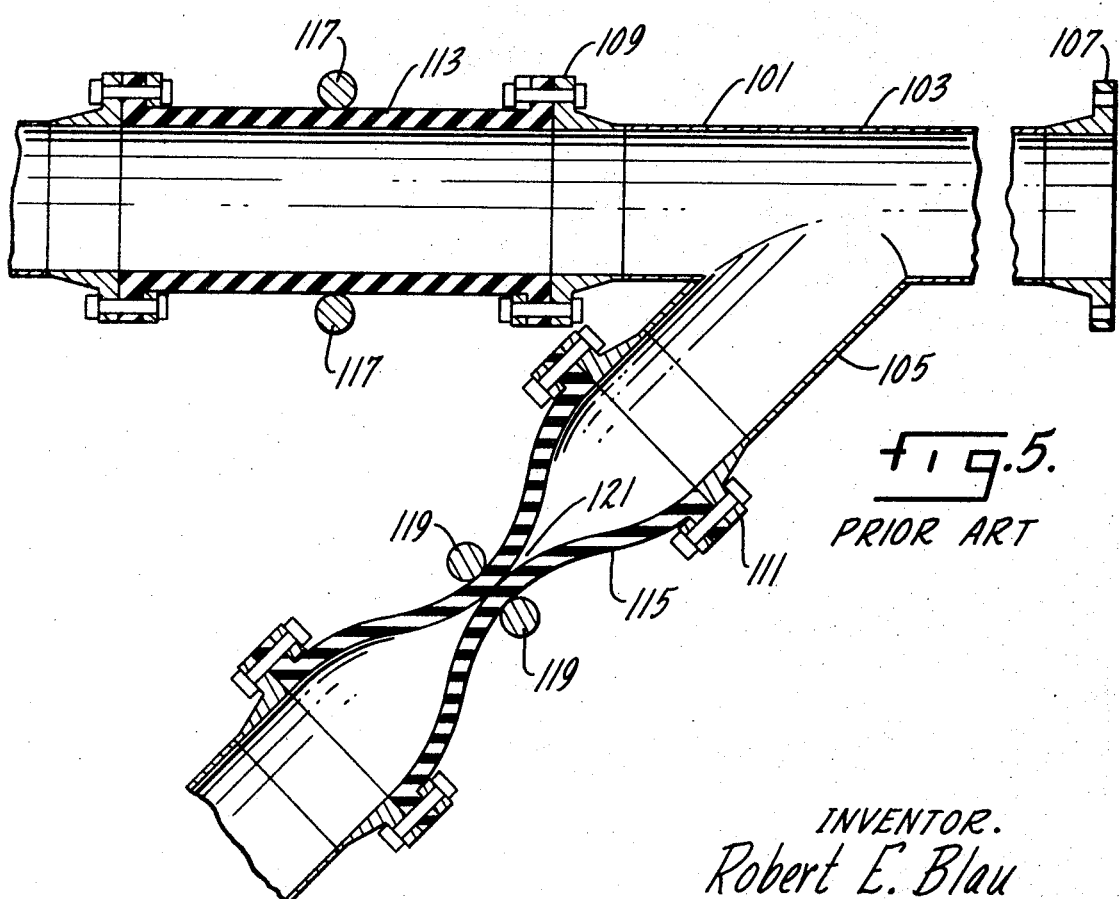
FIG. 5 is a longitudinal cross-sectional view of a prior art valve embodiment.

FIG. 5 shows the prior art construction which the valve body of this invention is intended to replace. The prior art structure includes a Y-shaped rigid fitting 101 having a straight leg 103 and a branch leg 105. The straight leg has flanges 107 and 109 at the ends thereof and the branch leg 105 has a flange 111 at the end thereof. Positioned at the outlets of the straight leg 103 and the branch leg 105 are flexible tubular body members 113 and 115. The tubular body members are bolted to the outlet flanges 109 and 111. A pair of pinch rollers is provided for each tubular body with rollers 117 provided for tubular body 113 and rollers 119 provided for tubular body 115. The closing of the tubular body 115 by the pinch rollers 119 brings the wall of the body together at 121 as shown in FIG. 5. The closing of tubular body member 115 provides a trapped space between the collapsed wall at 121 and the straight leg 103 of the Y-shaped fitting 101.

The use, operation and function of the invention are as follows:

FIG. 1 of the drawings shows the valve body in an operating position with the branch leg 21 open and the straight leg 19 closed. When the shaft 75 is rotated in a clockwise direction as viewed in FIG. 1, the links 67 and 69 will move pinch rollers 63 and 65 along slots 57 and 59 to the position shown in FIG. 3 in which the straight leg 19 is fully open and the branch leg 21 is fully closed. The fully open position of the straight leg 19 and the fully closed position of the branch leg 21 are shown by dashed lines in FIG. 4.

During rotation of the shaft 75 as previously described, the pinch roller 77 moves through an arcuate path from the position shown in FIG. 1, through an intermediate position shown in FIG. 4, to the position shown in FIG. 3. During this movement through this arcuate path, the pinch roller 77 engages the outer surface of the nose portion 33 of the valve body and assists in moving the nose portion away from the leg being opened and towards the leg being closed.

The pinch rollers and linkage arrangement of this invention permits the pinch rollers to be located close to the juncture of the legs of the Y-shaped valve body thereby reducing the volume of material in the branch leg 21 which is trapped by closing of the branch leg. For example, the slug of material trapped in the branch leg 21 of valve body 11 will be much smaller than the slug of material trapped in branch leg 105 of the typical prior art arrangement shown in FIG. 5.

The roller mechanism and linkage of this invention also reduce the number of pinch rollers required for operation of a valve from the four shown in the prior art structure of FIG. 5 to the three pinch rollers shown in this embodiment of the invention. The embodiment of this invention also eliminates two of the flange connections used with the prior art structure of FIG. 5. The loops 44 and 45 which fit around the pinch rollers also enable the pinch rollers to maintain the proper alignment of the valve body upon operation of the linkage mechanism.

I claim:

1. A flexible, pinch valve for conveying dry materials and slurries, including:
   a one piece, generally Y-shaped, tubular flexible valve body formed of straight leg elastomer, said generally Y-shaped tubular body having a straight leg and a branch leg with said branch leg extending from said straight leg and dividing said straight leg into inlet and outlet portions,
   said outlet portion of said straight leg and said branch leg forming an acute angle with each other,
   openings in the ends of said legs,
   pinch roller means associated with the outlet portion of the straight leg and the branch leg to pinch closed one of said legs while simultaneously opening the other of said legs,
   a housing surrounding said tubular flexible valve body, and
   pinch roller guides formed in said housing adjacent to the branch leg and the outlet portion of said straight leg,
   said pinch roller means for pinching closed one of said legs while simultaneously opening the other of said legs including
   pinch rollers positioned in said guides with said rollers located outwardly of the legs of the generally Y-shaped valve body,
   an operating shaft positioned between the legs of the valve body,
   a pinch roller mounted on arms attached to the operating shaft, and
   links connecting said operating shaft and said pinch rollers positioned in said guides.

2. The pinch valve of claim 1 further characterized in that:
   a nose portion is formed in the tubular valve body at the juncture of the branch leg and the outlet portion of the straight leg,
   said shaft mounted pinch roller is positioned to engage and move said nose portion of said valve body during movement from contact with one leg into contact with the other leg of said Y-shaped valve body.

3. The valve body of claim 1 further characterized in that said guide positioned pinch rollers extend through loops formed as part of said Y-shaped valve body.

4. A one piece, generally Y-shaped tubular flexible valve body formed of an elastomer,
   said generally Y-shaped, tubular body having a straight leg and a branch leg with said branch leg extending from said straight leg and dividing said straight leg into inlet and outlet portions,
   said outlet portion of said straight leg and said branch leg forming an acute angle with each other,
   openings in the ends of said legs,
   a nose portion formed in the tubular valve body at the juncture of the branch leg and the outlet portion of the straight leg,
   said nose being reinforced by an arcuate shaped insert of a material stiffer than the adjacent portions of the valve body,
   said nose portion and said tubular flexible valve body being formed and adapted to move in a manner such that when one of the legs is being pinched closed, the nose portion will move in the direction of that leg.

* * * * *